(12) United States Patent
Kliner et al.

(10) Patent No.: US 6,825,974 B2
(45) Date of Patent: Nov. 30, 2004

(54) LINEARLY POLARIZED FIBER AMPLIFIER

(75) Inventors: Dahv A. V. Kliner, San Ramon, CA (US); Jeffery P. Koplow, Washington, DC (US)

(73) Assignee: Sandia National Laboratories, Livermore, CA (US)

( * ) Notice: Subject to any disclaimer, the term of this patent is extended or adjusted under 35 U.S.C. 154(b) by 398 days.

(21) Appl. No.: 10/011,553

(22) Filed: Nov. 6, 2001

(65) Prior Publication Data

US 2003/0086668 A1 May 8, 2003

(51) Int. Cl.$^7$ ................................................. H01S 3/00
(52) U.S. Cl. ............................................... 359/341.1
(58) Field of Search ......................... 385/123; 359/341.1

(56) References Cited

U.S. PATENT DOCUMENTS

| | | | | |
|---|---|---|---|---|
| 4,669,814 A | * | 6/1987 | Dyott | 385/42 |
| 5,561,675 A | * | 10/1996 | Bayon et al. | 372/6 |
| 5,701,318 A | * | 12/1997 | Digonnet et al. | 372/6 |
| 5,822,487 A | * | 10/1998 | Evans et al. | 385/123 |
| 6,167,066 A | * | 12/2000 | Gaeta et al. | 372/6 |
| 6,434,311 B1 | * | 8/2002 | Danziger et al. | 385/126 |
| 6,542,681 B2 | * | 4/2003 | Broeng et al. | 385/123 |
| 6,563,995 B2 | * | 5/2003 | Keaton et al. | 385/127 |
| 2002/0172486 A1 | * | 11/2002 | Fermann | 385/128 |

FOREIGN PATENT DOCUMENTS

JP      08313749 A  *  11/1996  ............ G02B/6/17

* cited by examiner

*Primary Examiner*—Nelson Moskowitz
*Assistant Examiner*—Deandra M. Hughes
(74) *Attorney, Agent, or Firm*—John P. Wooldridge; Timothy P. Evans

(57) ABSTRACT

Optically pumped rare-earth-doped polarizing fibers exhibit significantly higher gain for one linear polarization state than for the orthogonal state. Such a fiber can be used to construct a single-polarization fiber laser, amplifier, or amplified-spontaneous-emission (ASE) source without the need for additional optical components to obtain stable, linearly polarized operation.

40 Claims, 10 Drawing Sheets

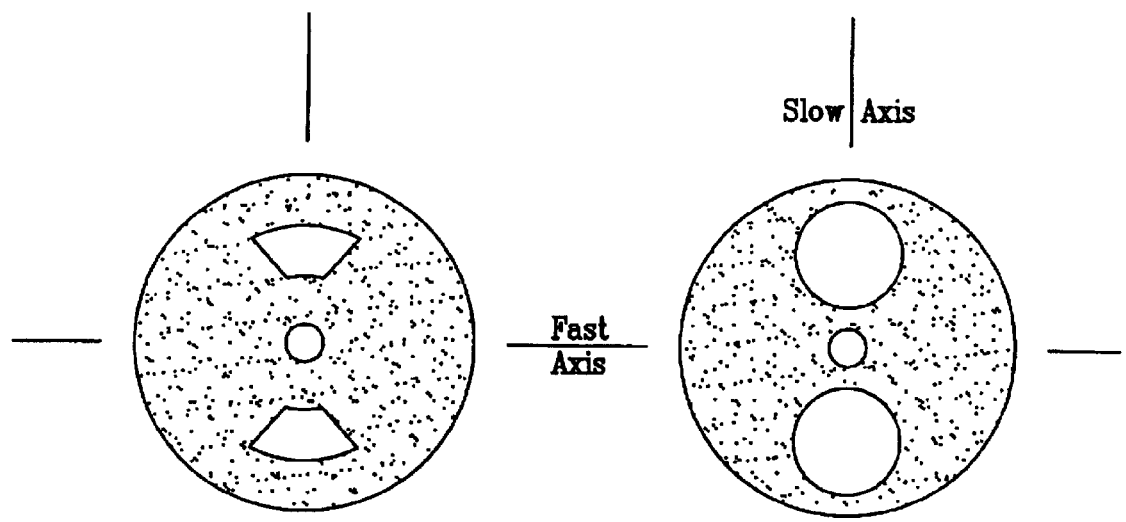
Bow-tie
Figure 1A
Prior Art
Panda
Figure 1B
Prior Art
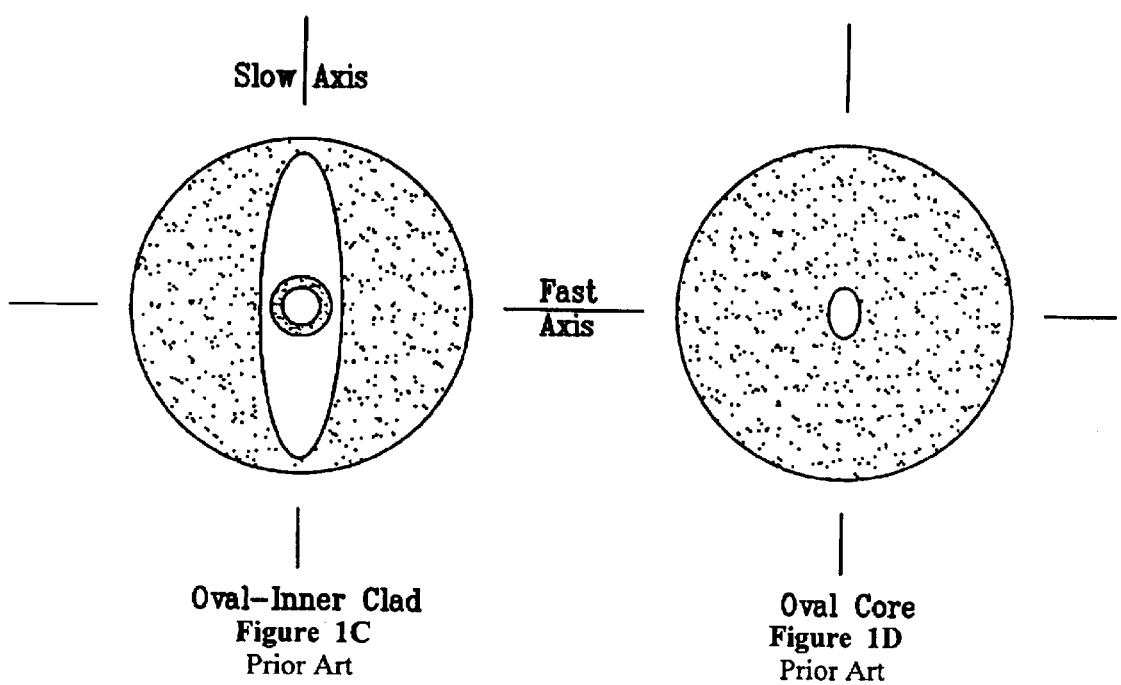
Oval-Inner Clad
Figure 1C
Prior Art
Oval Core
Figure 1D
Prior Art

LINEARLY POLARIZED FIBER AMPLIFIER

The United States Government has rights in this invention pursuant to Contract No. DE-AC04-94AL85000 between the United States Department of Energy and Sandia Corporation for the operation of Sandia National Laboratories.

BACKGROUND OF THE INVENTION

1. Field of the Invention

The present invention relates to fiber optics, fiber lasers, and fiber amplifiers, and more specifically, it relates to a rare-earth-doped fiber that, when optically pumped, has significantly higher gain for one linear polarization state than for the orthogonal state.

2. Description of Related Art

Introduction

Single-mode, rare-earth-doped fiber lasers and amplifiers are increasingly used in applications requiring compact, rugged, electrically efficient optical sources with high beam quality. Stable, linear polarization is required for many of these applications, including fiber-optic gyroscopes, interferometric fiber sensors, pumping of optical parametric oscillators and amplifiers, nonlinear frequency conversion, construction of mode-locked fiber lasers and narrow-linewidth fiber sources, polarization multiplexing, and most designs of phase or amplitude modulators. Conventional fiber sources have a time-varying (in general, elliptical) output polarization because of birefringence in the optical fiber and its variation with thermal and mechanical fluctuations.

The prior art includes a variety of methods for addressing fiber birefringence in both passive fibers and active fibers (i.e., fibers with optical gain). A discussion of the prior art provides the context for the present invention. For simplicity, most of the discussion will assume a step-index refractive-index profile for the fiber; this assumption affects some of the quantitative details, but the main conclusions of the analysis and the relevant design considerations will apply to other fiber types.

The following symbols are used herein:

a: core radius of the fiber.

$\lambda$: free-space wavelength; most calculations will use $\lambda=1100$ nm (a typical value for Yb-doped fiber).

$n_i^j$: index of refraction; used with a subscript, i, to define the polarization state and superscript, j, to define the medium (e.g., $n_x^{core}$ is the index of refraction of x-polarized light in the fiber core); explicit definitions will be given in the text.

NA: numerical aperture; related to the acceptance angle of the fiber by NA=$\sin \theta_{max}$, where $\theta_{max}$ is the maximum angle of incidence for a ray that will be guided by the fiber; for a step-index fiber, the NA is determined by the refractive indices of the core and cladding ($n^{core}$ and $n^{clad}$, respectively) according to NA=$((n^{core})^2-(n^{clad})^2)^{1/2}$.

V: fiber V-number (also called the "normalized frequency"); V=$2\pi$NA a/$\lambda$. V is useful for characterizing the guiding properties of a fiber and is a critical parameter in specifying the fiber design for the present invention. A step-index fiber is single-mode for V<2.405.

$LP_{01}$: the fundamental (lowest-order) mode of a fiber, and the only guided mode for a single-mode fiber, consists of two, nearly linearly polarized states (generally referred to as x-polarized and y-polarized).

$\omega_0$: the mode-field radius for the $LP_{01}$ mode, measured at the $1/e^2$ power density.

$\Delta n_i$: difference in the refractive index (e.g., $\Delta n_{xy}$ for the difference in index between x-polarized and y-polarized light); again, a superscript may be used to indicate the medium, and explicit definitions will be given below.

$L_b$: beat length (the length of birefringent fiber over which the x- and y-polarized modes experience a phase shift of $2\pi$); $L_b=\lambda/\Delta n_{xy}$, i.e., the beat length is inversely proportional to the fiber birefringence. Beat lengths will be given at $\lambda=633$ nm unless otherwise noted.

Other definitions will be introduced in the text as needed. Units of dB will generally be used to express the ratio of two optical powers, e.g., the extinction ratio in dB between the x- and y-polarized modes (with powers $P_x$ and $P_y$, respectively) is given by $-10 \log(P_y/P_x)$.

Passive Fibers

A "perfect" optical fiber, with no internal or externally applied stresses, will not be birefringent and will maintain the polarization state of light injected into the core. Any real fiber has birefringence from stresses developed in the manufacturing and subsequent handling (including bending or coiling) of the fiber. Because of this birefringence, light injected into the fiber will not maintain its polarization state, and the output polarization state will vary on the time scale over which the mechanical and thermal environment changes (S. C. Rashleigh, J. Lightwave Technol. 1, 312 (1983)). A linear polarizer placed after the fiber will ensure linear polarization but will cause power fluctuations as the output polarization state varies. Similarly, polarization controllers can convert a given elliptical polarization state to linear polarization, but they require adjustment as the output polarization changes.

Extensive research during the 1980's led to the development of passive polarization-maintaining (PM) fiber, in which a relatively large, stress-induced, linear birefringence is frozen into the fiber during manufacture (J. Noda et al., J. Lightwave Technol. 4, 1071 (1986)). This birefringence is provided by the incorporation of stress elements or rods into the fiber cladding. The stress elements (often composed of borosilicate glass) have a different (usually larger) thermal expansion coefficient than does the surrounding cladding glass (generally silica, possibly doped with germanium, phosphorous, and other materials); as the fiber cools after being drawn, the different expansion coefficients cause stress to accumulate in the fiber, which induces linear birefringence. Linearly polarized light launched into the fiber with its polarization vector aligned either along or perpendicular to the stress rods (denoted x-polarized and y-polarized, respectively) will maintain its linear polarization state because the induced birefringence "overwhelms" the other sources of birefringence. (An alternative approach uses an elliptical core, but this design is less popular because the core is not well matched to standard, circular-core fibers and because the output beam is elliptical.)

FIGS. 1A–1D show several designs of commercially available passive PM fiber. Beat lengths are typically in the range of 1 mm to 1 cm at $\lambda=633$ nm (a standard wavelength at which to report $L_b$); the corresponding values of $\Delta n_{xy}$ are $6.33\times10^{-4}$ to $6.33\times10^{-5}$. (For comparison, typical fibers have an index difference between the core and the cladding ($\Delta n^c$) that is a factor of ~10 smaller than $\Delta n_{xy}$: $\Delta n^c=2.2\times10^{-3}$ to $1.4\times10^{-2}$, corresponding to NA values of 0.08–0.20, respectively.) $L_b$ values as low at 0.55 mm ($\Delta n_{xy}=1.2\times10^{-3}$) have been obtained using "bow-tie" stress elements (R. D. Birch et al., Electron. Lett. 18, 1036 (1982)). Recently, a highly birefringent "photonic crystal" or "holey" fiber has been reported, in which the cladding contained an array of air holes; a beat length of 0.42 mm at λ=1540 nm ($\Delta n_{xy}$=3.7×10$^{-3}$) was obtained, corresponding to $L_b$<0.2 mm at λ=633 nm (A. Ortigosa-Blanch et al., Opt. Lett. 25, 1325 (2000)).

For many applications, fiber that supports only a single linear polarization state would be preferable. Such "polarizing" (PZ) fiber has been demonstrated, although it is not as readily available as PM fiber. Obtaining PZ operation of a passive fiber entails introducing substantial loss for one linear polarization state (e.g., y-polarized) and relatively little loss for the orthogonal state (x-polarized). As discussed below, most PZ fibers are highly birefringent. FIG. 2A shows the refractive-index profile for a non-birefringent fiber and FIGS. 2B–2E show the refractive-index profiles for several possible designs of birefringent fiber; the birefringent designs lead to a number of mechanisms for excess loss of one polarization state. The demonstrated or suggested approaches to fabricating PZ fiber are as follows:

1) In FIGS. 2B and 2C, the birefringence is larger in the core than in the cladding, leading to a lower NA for y-polarized than x-polarized light. The lower-NA state is less strongly guided and is thus more susceptible to bend loss. The cause of this increased bend sensitivity is illustrated in FIG. 3, which shows the $LP_{01}$ mode-field radius ($\omega_0$; expressed in units of the core radius, a) as a function of fiber V-number for a step-index fiber. Because both a and λ are the same for x- and y-polarized light, the V-number is directly proportional to the NA. In the range of interest for single-mode fibers (V≈1–2.4), the lower-NA polarization state has a larger mode-field radius, resulting in a larger susceptibility to bend loss when the fiber is coiled. The polarization extinction ratio and the wavelength region in which strong preference for propagation of x-polarized light exists can be adjusted by varying the radius of curvature of the fiber (i.e., the diameter of the spool on which the fiber is wound); typically, PZ operation is obtained over an approximately 100 nm region when λ is near 1000 nm. (M. P. Varnham et al., Electron. Lett. 19, 246 (1983); M. P. Varnham et al., Opt. Lett. 9, 306 (1984); K. Okamoto, Appl. Opt. 23, 2638 (1984); K. Okamoto, J. Lightwave Technol. 3, 758 (1985).)

2) In FIG. 2D, $n_y^{core}$ and $n_y^{clad}$ have been made equal, so the fiber is non-guiding for y-polarized light. This situation is ideal for obtaining PZ operation, but it is difficult to achieve in practice. (W. Eickhoff, Opt. Lett. 7, 629 (1982); A. W. Snyder and F. Rühl, J. Opt. Soc. Am. 73, 1165 (1983).)

3) In FIG. 2E, the birefringence ($\Delta n_{xy}$) is equal in the core and in the cladding; the x- and y-polarized states thus have the same NA and V-number. Nonetheless, the core will be "leaky" (i.e., will experience some radiation loss) for y-polarized light if the birefringence is sufficiently large. This loss arises because, in a nonplanar waveguide (such as a cylindrical fiber), the y-polarized mode has a small x-polarized component. This component "sees" the cladding index $n_x^{clad}$ and experiences loss when $n_x^{clad}$ is higher than the effective index of the y-polarized mode. For appropriate values of $V_x$ and $\Delta n_{xy}$, this loss is calculated to be substantial, leading to PZ operation (in general, the loss increases for decreasing $V_x$ and for increasing $\Delta n_{xy}$). In typical high-birefringence fibers, $\Delta n_{xy}^{core}$ is larger than $\Delta n_{xy}^{clad}$ (K. Okamoto, Appl. Opt. 23, 2638 (1984)), so the refractive-index profile shown in FIG. 2E is less realistic than that shown in FIG. 2B; nonetheless, the leaky-mode mechanism can contribute to PZ operation. (A. W. Snyder and F. Rühl, J. Opt. Soc. Am. 73, 1165 (1983); M. P. Varnham et al., Electron. Lett. 19, 246 (1983).)

4) The above mechanisms for PZ operation can be implemented with refractive-index profiles other than step-index (e.g., graded-index or W-type profiles).

5) In a birefringent fiber whose core is surrounded by a ring with a depressed index of refraction (a W-type fiber), a "tunneling" mechanism can occur, in which the lower effective index of the y-polarized mode causes it to be leaky (or unguided if its effective index drops below that of the cladding outside of the ring). This approach can provide PZ fibers with relatively broad wavelength coverage (J. R. Simpson et al., J. Lightwave Technol. 1, 370 (1983); R. H. Stolen et al., Electron. Lett. 24, 524 (1988); F. F. Rühl and D. Wong, Opt. Lett. 14, 648 (1989); K. Tajima et al., J. Lightwave Technol. 7, 1499 (1982); M. J. Messerly et al., J. Lightwave Technol. 9, 817 (1991)). In addition, the stress elements can be made absorptive to provide further polarization discrimination (K. S. Chiang, J. Lightwave Technol. 7, 436 (1989)).

6) Another approach for fabricating PZ fiber entails introducing an absorptive loss for one polarization state by placing a metal film on one side of the core or on opposite sides (but not surrounding the core). The metal film can be incorporated into the preform before drawing the fiber; alternatively, after drawing, the fiber cladding can be etched or polished off on one side (typically to within less than 1 μm of the core) and a metal coating applied to the flat surface. Light polarized with its electric vector parallel to the metal surface experiences high loss, while light polarized perpendicular to the surface experiences little loss. (W. Eickhoff, Electron. Lett. 16, 762 (1980); P. Kornreich et al., Proceedings of the SPIE 2749, 11 (1996).)

7) A metal-clad fiber can also provide polarization discrimination based on the existence of a long-wavelength cut-off for the mode polarized perpendicularly to the metal film. The parallel-polarized mode has no such cut-off, resulting in a wavelength band in which only the parallel-polarization state is guided. (W. Eickhoff, Electron. Lett. 16, 762 (1980); T. Hosaka et al., Opt. Lett. 8, 124 (1983); T. Hosaka et al., J. Quantum Electron. 18, 1569 (1982).)

8) A birefringent crystal can be used to provide high loss for one polarization state. In this technique, the cladding is removed on one side of the fiber (as was mentioned for one implementation in point 6), and the crystal is pressed against the flat-polished surface. If the refractive index of the crystal is larger than the effective waveguide index for one polarization and less for the orthogonal polarization, the former polarization state will excite a bulk wave in the crystal and escape from the fiber while the latter polarization state will continue to be guided. (R. A. Bergh et al., Opt. Lett. 5, 479 (1980).)

In general, more than one of these mechanisms can contribute to PZ operation. For instance, in a highly birefringent fiber, the y-polarized mode may be leaky because of mechanism 3, and the loss can be increased via mechanism 1 by coiling the fiber around a spool of appropriate diameter.

Active Fibers

In an active or gain fiber, rare-earth ions (e.g., $Er^{3+}$ or $Yb^{3+}$) are doped into the fiber core. When optically pumped (typically using a diode laser), these fibers exhibit gain over a wavelength region characteristic of the rare-earth dopant. Rare-earth-doped fibers are used to construct lasers, amplifiers, and amplified spontaneous emission (ASE) sources. Single-mode fibers, which support only $LP_{01}$, are often (but not always) used because of their intrinsically high beam quality. (*Rare Earth Doped Fiber Lasers and Amplifiers*, edited by M. J. F. Digonnet (Marcel Dekker, New York, 1993); *Erbium-Doped Fiber Amplifiers*, P. C. Becker et al. (Academic Press, San Diego, 1999).)

Double-clad (DC) fiber is a particularly useful type of rare-earth-doped fiber (L. Zenteno, J. Lightwave Technol. 11, 1435 (1993)). In a DC fiber, the core is surrounded by a larger, multimode inner cladding; the pump light is launched into the inner cladding (but absorbed only in the core), allowing the use of high-power, relatively inexpensive, multimode pump sources. Standard single-clad fiber may be used for applications requiring up to approximately 100 mW; for higher-power applications (up to over 100 W), DC fiber is generally used (although DC fiber may also be used for the lower-power applications).

As with passive fiber, rare-earth-doped fiber is generally birefringent and does not maintain or produce linearly polarized output. Two approaches to obtaining linear-polarization operation using non-PM, rare-earth-doped fiber are: (1) double passing the gain fiber using a Faraday mirror, which provides an output polarization orthogonal to the input polarization over the wavelength range that the Faraday mirror operates (I. N. Duling and R. D. Esman, Electron. Lett. 28, 1126 (1992)), and (2) tension coiling the gain fiber to induce birefringence (J. P. Koplow et al., Opt. Lett. 25, 387 (2000)). The former approach obstructs one end of the fiber and, because double passing is required, is incompatible with some configurations of the laser or amplifier (e.g., a ring cavity); moreover, use of a Faraday mirror decreases the threshold for nonlinear processes (which are often undesirable) by effectively increasing the amplifier length, reduces the stored energy by recirculating ASE, and encourages parasitic lasing by providing feedback at one end of the high-gain amplifier. The latter approach is not applicable to all gain fibers. In particular, low-NA fibers have limited bend radii (because of bend loss), which limits the maximum attainable birefringence; low-NA fibers are required for generation of high-peak-power, high-energy optical pulses and high-average-power, narrow-linewidth radiation.

Although passive PM fiber is widely available (as described above), there are few examples of rare-earth-doped PM fiber. The most widely available PM gain fiber is an Er-doped, single-clad fiber made by Fibercore (Southampton, England) that incorporates stress elements into the cladding. More recently, double-clad PM Yb-doped fiber has been reported; in this fiber, the stress elements were located in the inner cladding (D. A. V. Kliner et al., Opt. Lett. 26, 184 (2001)).

In all of the above cases, obtaining a linearly polarized output beam from a fiber laser, amplifier, or ASE source requires a linearly polarized seed beam and/or a polarizer. Direct generation of stable, linearly polarized output (without additional optical elements) requires PZ gain fiber, which is the subject of this patent.

SUMMARY OF THE INVENTION

It is an object of the present invention to provide a linearly polarized fiber amplifier.

It is another object of the invention to provide a method for producing linearly polarized light from a fiber amplifier.

Another object of the invention is to provide methods for fabricating linearly polarized fiber amplifiers.

These and other objects of the invention will be apparent to those skilled in the art based on the teachings herein.

Rare-earth-doped fibers are described that exhibit significantly higher gain for one linear polarization state than for the orthogonal state when the fiber is optically pumped. Polarizing operation is obtained by appropriately choosing the fiber NA, core size, and birefringence, such that the two polarization states have substantially different V-numbers and different degrees of overlap with the rare-earth dopant.

A basic embodiment of the invention is a linearly polarized fiber amplifier (LPFA) formed from a length of fiber optic that includes a core and a surrounding cladding. The LPFA has a rare-earth dopant in either or both of the cladding and core and comprises a first V-number for a first linear polarization state and a second V-number for a second linear polarization state that is substantially orthogonal to the first linear polarization state. When optically pumped, the fiber optic exhibits preferential gain for the first linear polarization state rather than for the second linear polarization state.

The rare-earth dopant is confined to the core in most gain fibers, and thus, the overlap of the fundamental (lowest-order) mode-field distribution with the rare-earth dopant, and the optical gain, is a strong function of V in the range of interest. In an appropriately designed birefringent fiber, V can be different for orthogonally polarized light, leading to preferential gain for the polarization state which is more tightly confined to the core.

The rare-earth-doped fiber may be single-clad or double-clad and the core may be single mode or multimode. If multimode, various approaches may be employed to achieve single-transverse-mode operation. The fiber may be silica-based or may be comprised of any other glass or combination of glasses.

BRIEF DESCRIPTION OF THE DRAWINGS

FIGS. 1A–1D show several designs of commercially available passive PM fiber.

DETAILED DESCRIPTION OF THE INVENTION

The present invention describes embodiments of rare-earth-doped fibers that exhibit significantly higher gain for one linear polarization state than for the orthogonal state when the fiber is optically pumped, thereby causing PZ operation. This preference is obtained by judicious choice of the fiber NA, core size, and birefringence, such that the two polarization states have substantially different V-numbers and hence substantially different degrees of overlap with the rare-earth dopant.

Figures 2A, 2B, 2C, 2D, 2E:
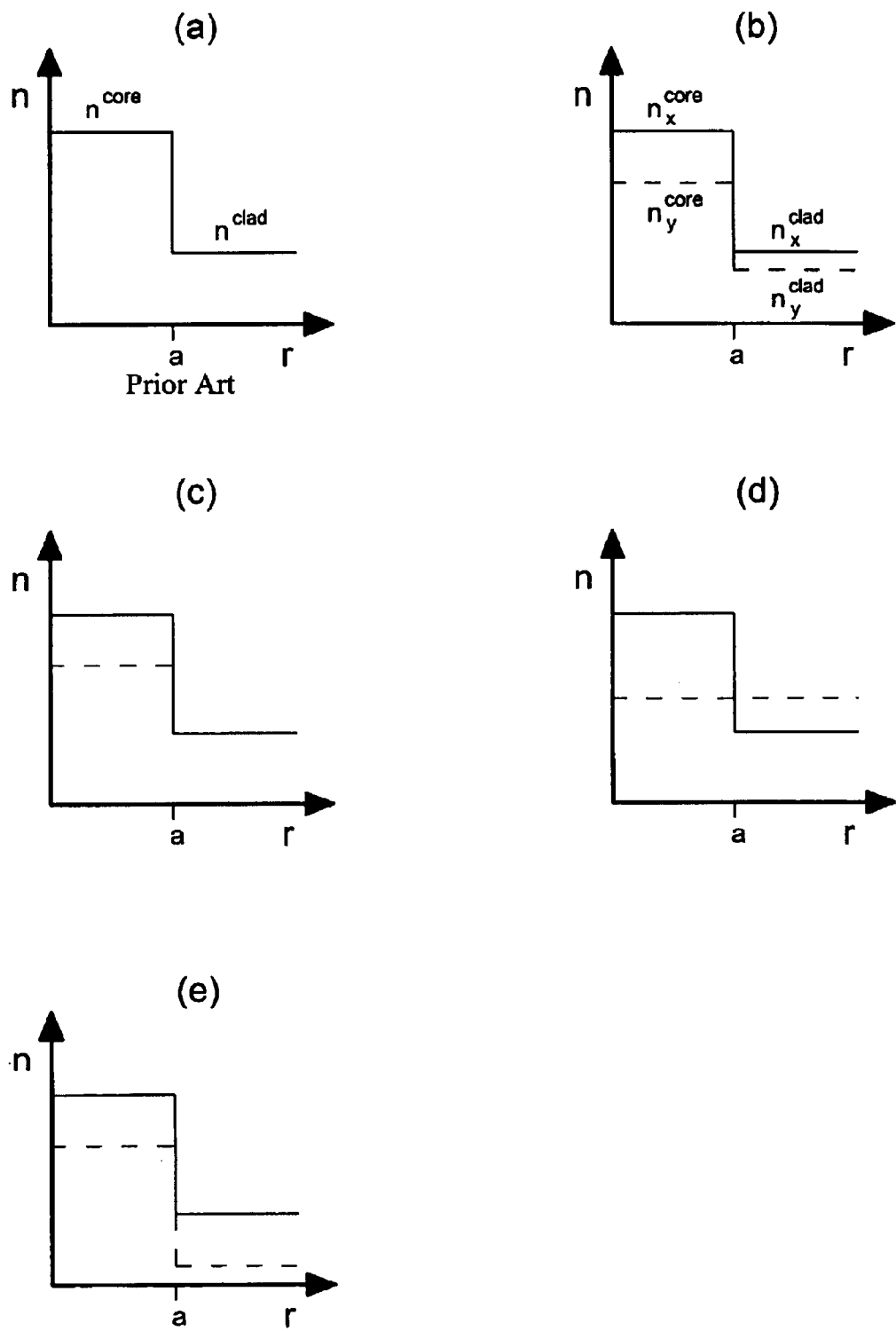
FIG. 2A shows the refractive-index profile for a non-birefringent fiber.
FIGS. 2B–2E show the refractive-index profile for several possible designs of birefringent fiber.
Figure 4A:
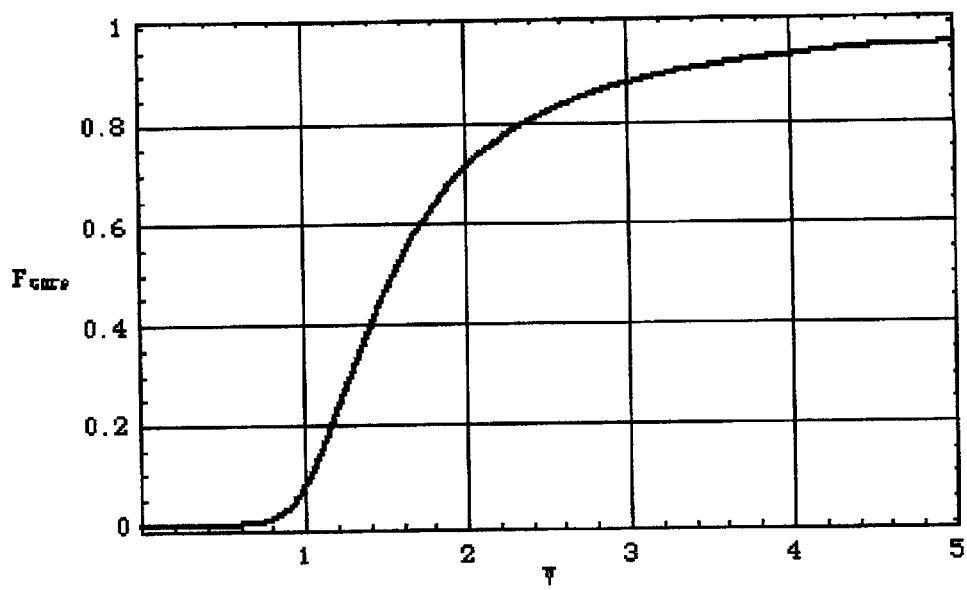
FIG. 4A shows the fraction of the $LP_{01}$ power that is in the core ($F_{core}$) vs. V for a step-index fiber.

The principle of the approach is illustrated in FIG. 4A, which shows the fraction of the $LP_{01}$ power that is in the core ($F_{core}$) vs. V for a step-index fiber (other refractive-index profiles exhibit qualitatively similar behavior). Between V-numbers of 1.0 and 2.5, $F_{core}$ changes dramatically. This range of V-numbers encompasses the relevant range for single-mode optical fibers. In most gain fibers, the rare-earth dopant is confined to the core. Hence, the overlap of the $LP_{01}$ mode-field distribution with the rare-earth dopant, and thus the optical gain, is a strong function of V in the range of interest. In an appropriately designed birefringent fiber, the x- and y-polarized modes can have different NA values, as shown in FIGS. 2B and 2C. The V-number, in turn, depends on the NA according to $V=2\pi NA\, a/\lambda$; because both a and $\lambda$ are the same for x- and y-polarized light, V can be different for x- and y-polarized light in a birefringent fiber, leading to preferential gain for the higher-NA polarization state (which is more tightly confined to the core).

More explicitly, the small-signal gain (G) of a rare-earth-doped fiber is given by $$G = \exp(\sigma N L f), \quad (1)$$

where $\sigma$ is the stimulated emission cross section for the excited-state rare-earth-dopant ion, N is the average density of the excited-state rare-earth dopant, L is the fiber length, and f is the integral of the $LP_{01}$ intensity distribution (the square of the mode-field distribution) with the rare-earth-dopant distribution:

$$f = \int_0^{2\pi} \int_0^a MF^2(r, \theta) RE(r, \theta) r\, dr\, d\theta, \quad (2)$$

where $MF(r, \theta)$ is the normalized mode-field distribution for the $LP_{01}$ mode, $RE(r, \theta)$ is the normalized rare-earth-dopant distribution, and $(r, \theta)$ are the spatial coordinates (cylindrical coordinate system); the limits of integration assume a round core of radius a with the rare-earth dopant confined to the core. Thus, the gain is exponentially sensitive to the value of f, which depends strongly on V over the relevant range. In the birefringent gain fibers that are the subject of this invention, $MF(r, \theta)$ is different for x- and y-polarized light, causing f and G to depend on the direction of linear polarization.

To calculate the enhancement of the x-polarized mode relative to the y-polarized mode, Eqs. (1) and (2) need to be evaluated for x- and y-polarized light. The polarization extinction ratio (PER) is defined as the ratio of the small-signal gain for the x- and y-polarized modes:

$$PER = \frac{G_x}{G_y} = \exp[\sigma N L (f_x - f_y)] = G_x^{(1-f_y/f_x)}, \quad (3A)$$

where the x and y subscripts on G and f refer to the polarization direction. In dB units:

$$PER = (1 - f_y/f_x) G_x \cong \epsilon G_x. \text{ (PER and } G_x \text{ in dB units)} \quad (3B)$$

Thus, the PER is simply the small-signal gain for the x-polarized mode multiplied by $\epsilon$. For most applications, a PER of 10–20 dB is sufficient. Typical rare-earth-doped fiber amplifiers have small-signal gains of 30–40 dB, and gains of >50 dB have been reported (J. P. Koplow et al., Photon. Technol. Lett. 10, 793 (1998)). Thus $\epsilon$ values >0.2 are of practical interest.

Equations (1)–(3) can be evaluated quantitatively if one knows $MF(r, \theta)$, which is determined from the refractive-index distribution and birefringence of the fiber, and $RE(r, \theta)$. To illustrate the principle of the present invention and the applicable fiber design considerations, these equations will be evaluated for a uniformly doped, birefringent, step-index fiber (i.e., a fiber with a refractive-index profile such as that shown in FIG. 2C and whose core has a uniform concentration of rare-earth dopant). Although these fiber parameters are somewhat idealized, they are sufficiently realistic to demonstrate the utility and feasibility of the invention and to provide relevant design considerations for producing PZ gain fiber.

Calculations for a Uniformly Doped, Birefringent, Step-Index Fiber

As discussed above, this calculation assumes a birefringent fiber with the refractive-index profile given in FIG. 2C, a round core, and a uniform rare-earth-dopant distribution within the core ($RE(r, \theta)=1$ for $r \leq a$). The Gaussian approximation for the $LP_{01}$ mode-field distribution derived by Marcuse is used (J. Opt. Soc. Am. 68, 103 (1978)):

$$MF(r, \theta) = \sqrt{\frac{2}{\pi \omega_0^2}} \exp\left[-\frac{r^2}{\omega_0^2}\right]. \quad (4)$$

Figure 3:
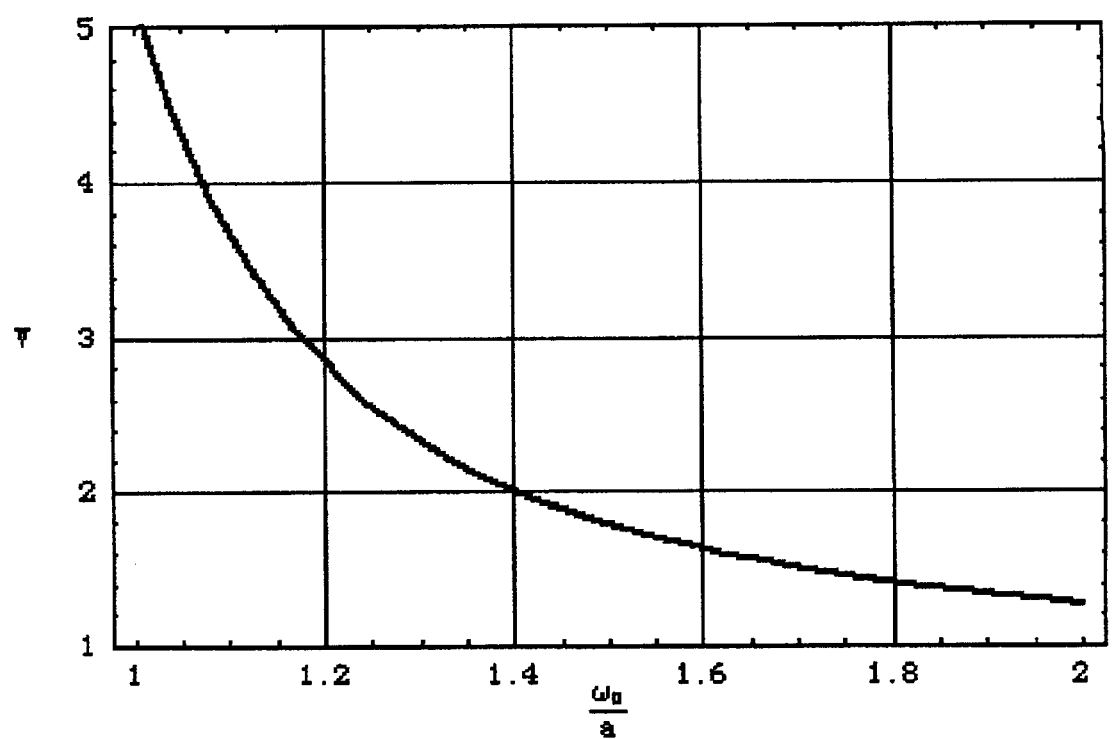
FIG. 3 shows the $LP_{01}$ mode-field radius ($\omega_0$; expressed in units of the core radius, a) as a function of fiber V-number for a step-index fiber.

Plots of the corresponding $1/e^2$ intensity radius ($\omega_0$) and $F_{core}$ vs. V are shown in FIGS. 3 and 4A, respectively. For such a fiber, the integral f given in Eq. (2) (and required to evaluate Eqs. (1) and (3)) is equal to $F_{core}$. As indicated in FIGS. 1 and 2C, the x- and y-axes are defined such that $n_x^{core} > n_y^{core}$ (the x-axis is thus referred to as the "slow axis"), and the fiber NA is larger for x-polarized than y-polarized light ($NA_x > NA_y$).

Because the $G_x/G_y$ ratio (Eq. (3)) is of interest in the present invention, specific values of $\sigma$, N, and L (which depend on details of the particular fiber and the dopant) are not required; rather, typical values for the gain of a fiber amplifier (i.e., $G_x$ for a birefringent fiber) may be used, and then the PER may be determined using the calculated values of $f_x$ and $f_y$ (which depend only on the assumed refractive-index profile and birefringence). The PER for $G_x = 30\text{--}50$ dB will be investigated.

Before reviewing the results of the calculations, some initial observations will help identify the range of fiber parameters that are of interest. The preferential gain for x-polarized light will be maximized when:

(1) the birefringence is maximized ($L_b$ is minimized), to maximize the difference between $NA_x$ and $NA_y$. High-birefringence $L_b$ values of 0.2–1 mm will be considered.

Figure 4B:
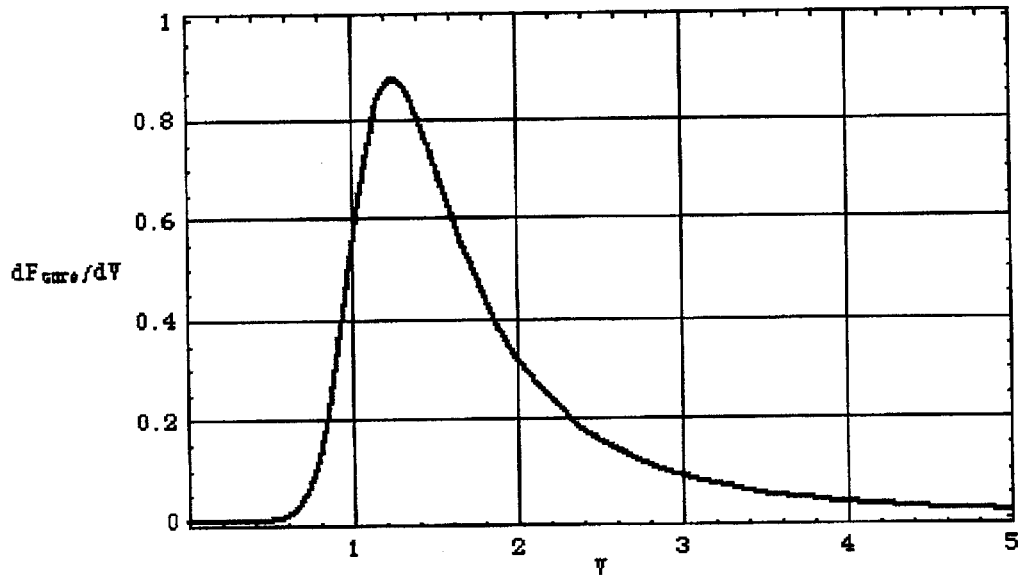
FIG. 4B shows the first derivative of $F_{core}$ with respect to V.

(2) the V-number is chosen to be in the range where $F_{core}$ is a strong function of V, i.e., where the slope of the curve in FIG. 4A is largest. FIG. 4B shows this slope (the first derivative of $F_{core}$ with respect to V) as a function of V; the sensitivity of $F_{core}$ to V reaches a maximum at $V=1.26$ and is within 50% of the maximum for $V=0.96\text{--}1.8$.

Figure 5:
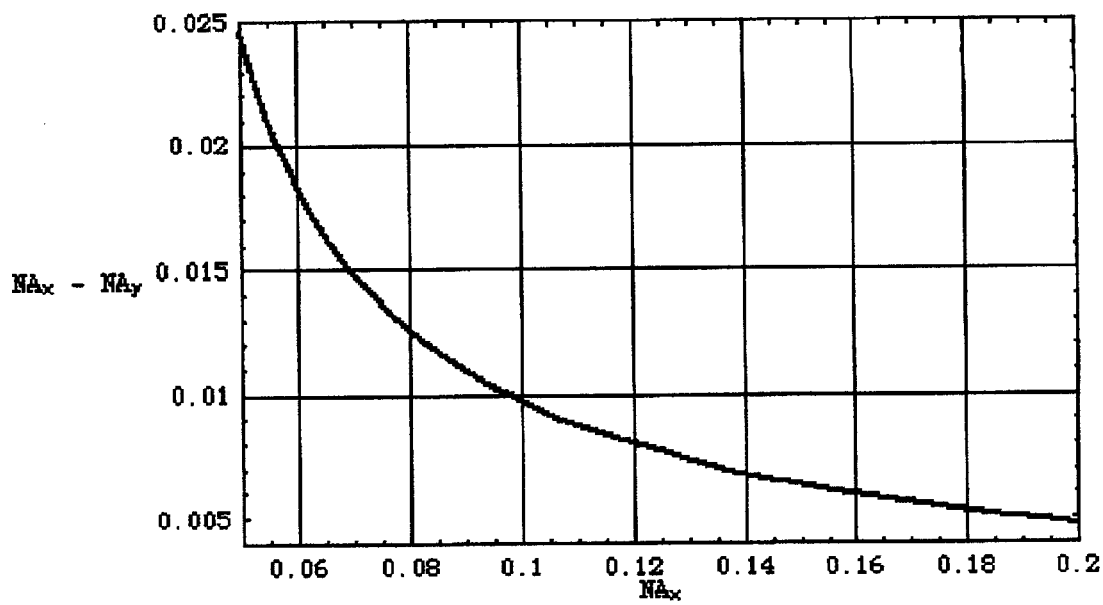
FIG. 5 shows ($NA_x - NA_y$) vs. $NA_x$ for representative values of $L_b$ and $\lambda$.

(3) $NA_x$ is minimized. This point is illustrated in FIG. 5, which shows $(NA_x - NA_y)$ vs. $NA_x$ for representative values of $L_b$ and $\lambda$ (1 mm and 1100 nm, respectively). The difference in NA values for the x- and y-polarized modes, and thus the difference in f and in G, increases with decreasing $NA_x$. This result arises because $\Delta n^c$ decreases with decreasing NA, making $\Delta n_{xy}$ a larger fraction of $\Delta n^c$ (for a given value of $L_b$). Results will be calculated for $NA_x$=0.05–0.20.

(4) the gain is maximized, as seen in Eq. (3a). Because $f_y \leq f_x$, the PER will be between unity ($G_y=G_x$) and $G_x$ ($G_y=0$).

Finally, in addition to maximizing the PER, other practical considerations will determine the allowed range of fiber parameters. In particular, bend loss will limit the acceptable combinations of NA and core size (a fiber that is too susceptible to bend loss will be overly sensitive to handling or coiling). In addition, for some applications, the requirement of avoiding nonlinear processes in the fiber will require relatively low NA's and large core sizes (i.e., large mode-field diameters). These considerations will be included in the following analysis.

Figure 6:
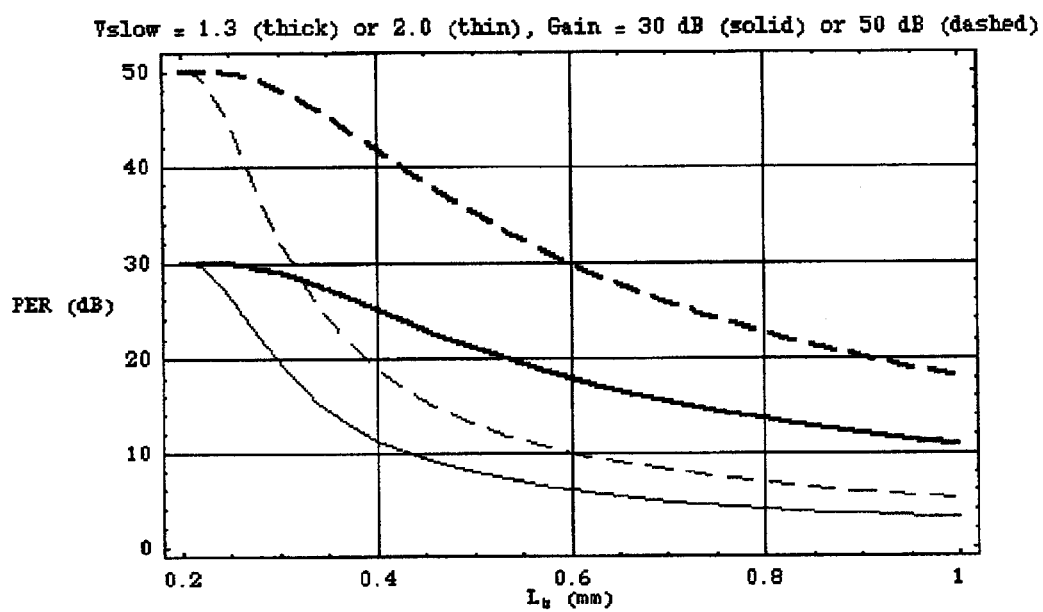
FIG. 6 shows the polarization extinction ratio (PER) vs. $L_b$ for $NA_x = 0.1$, $\lambda = 1100$ nm, $V_x = 1.3$ (thick lines) and 2.0 (thin lines), and $G_x = 30$ dB (solid lines) and 50 dB (dashed lines). These calculations were performed for a step-index fiber with the refractive-index profile shown in FIG. 2C FIGS. 7A–D show the PER as a function of $L_b$ and $NA_x$ for $V_x = 1.3$ and 2.0 and for $G_x = 30$ and 50 dB.
Figure 7A:
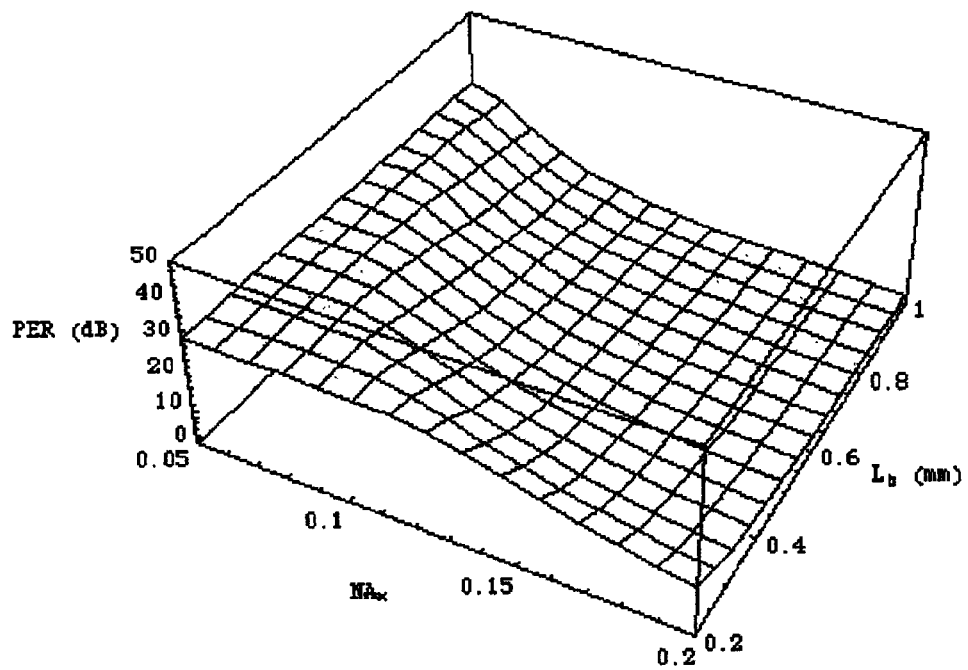
Figure 7B:
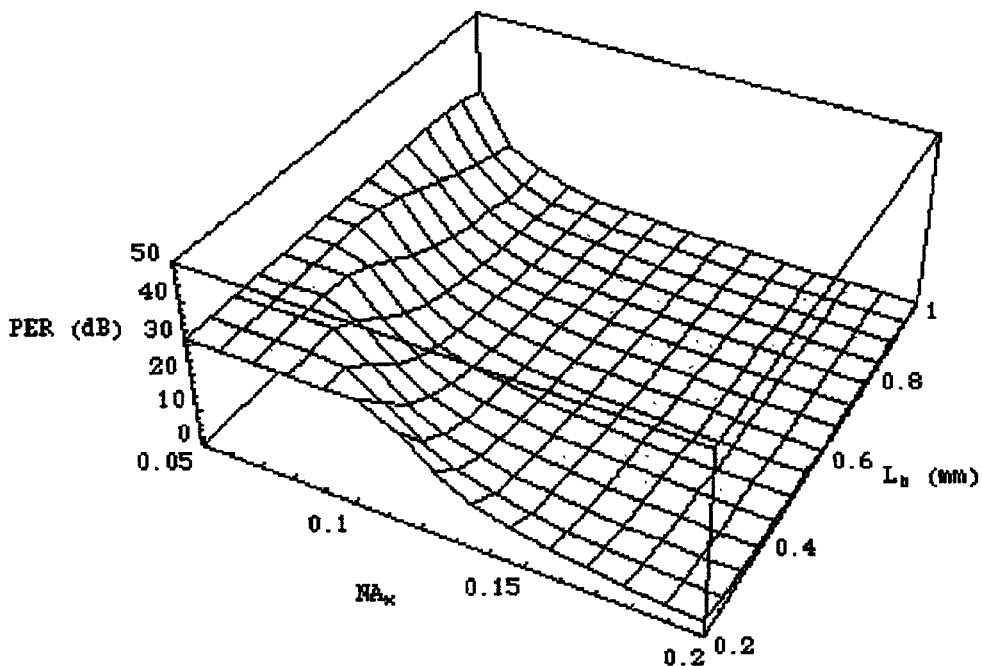
Figure 7C:
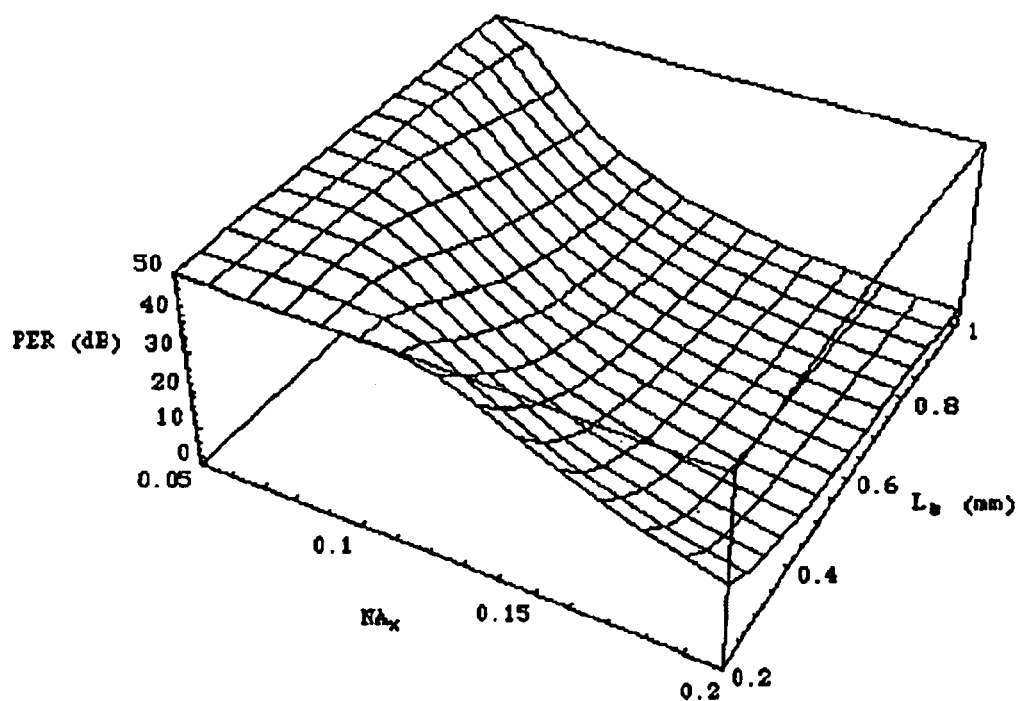
Figure 7D:
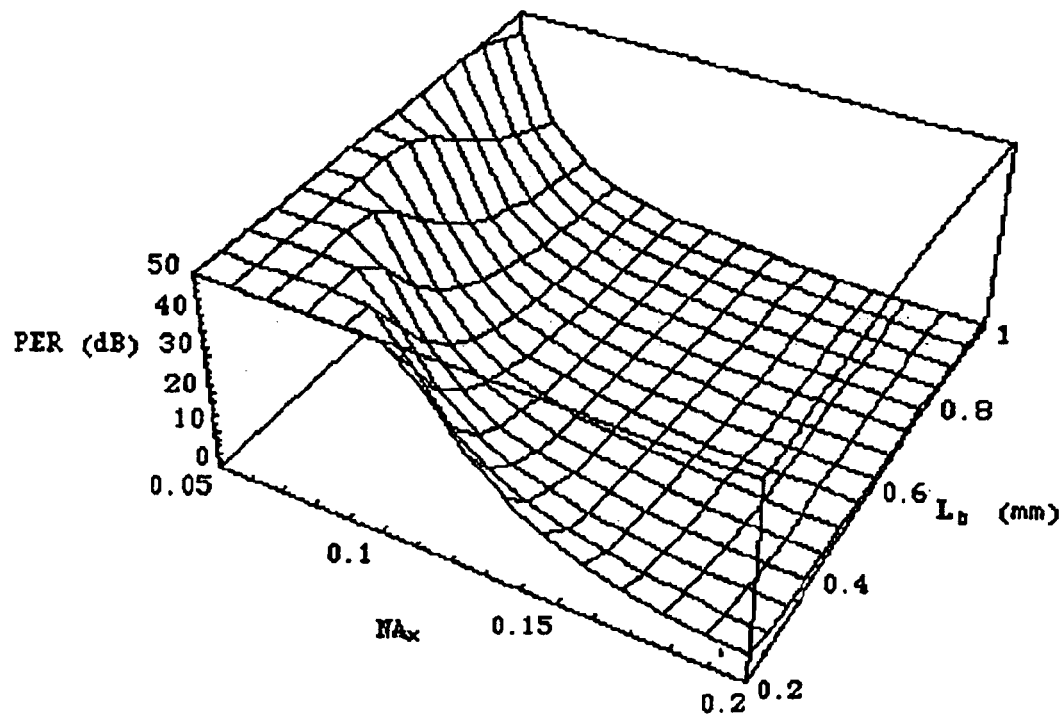

FIG. 6 shows the calculated PER as a function of beat length for $NA_x$=0.1, $\lambda$=1100 nm, two values of $V_x$ (1.3 and 2.0), and two values of $G_x$ (30 and 50 dB). The trends discussed above are evident in this figure: the PER is maximized by minimizing $L_b$ and $NA_x$ and by maximizing $G_x$, and a higher PER is provided by $V_x$=1.3 than by $V_x$=2.0. A more complete summary of the calculations is provided in FIGS. 7A–D, which show the PER as a function of $L_b$ and $NA_x$ for $V_x$=1.3 and 2.0 and for $G_x$=30 and 50 dB.

Figure 8A:
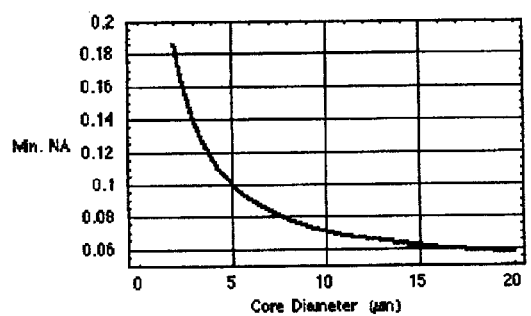
FIG. 8A shows the minimum NA vs. core diameter for which the fiber will not be excessively bend sensitive (for $\lambda = 1100$ nm).
Figure 8B:
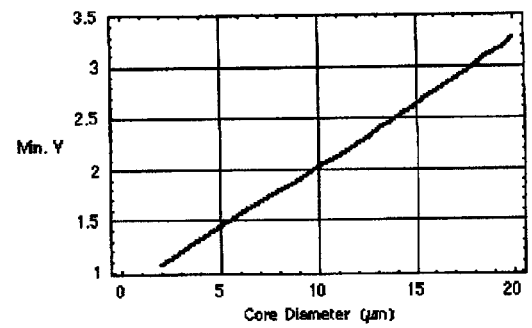
FIG. 8B shows the corresponding minimum V-number as a function of core diameter for which the fiber will not be excessively bend sensitive.

An evaluation can now be made whether the design parameters that provide useful PER values correspond to fibers with acceptable levels of bend sensitivity. Marcuse (J. Opt. Soc. Am. 66, 216 (1976)) reported formulas for calculating the bend loss of step-index fibers. An acceptable level of bend loss is herein defined as <10% attenuation of $LP_{01}$ for a 10 m length of fiber coiled on a 15 cm diameter spool. Although these parameters are somewhat arbitrary, bend loss is a very strong function of the radius of curvature (i.e., it is well characterized by a threshold radius); thus, the results of the analysis are not highly sensitive to the precise values chosen for the acceptable attenuation and the fiber length within reasonable limits for practical applications. For a given core diameter, bend loss increases with decreasing NA (decreasing V); thus, there exists a minimum acceptable NA (and minimum V) for a given core size. FIG. 8A shows the minimum NA and FIG. 8B shows the corresponding minimum V as a function of core diameter. As discussed above, FIGS. 4A and 4B show that the PER will be maximized (for a given $L_B$ and $G_x$) when V is ~1–2. From FIGS. 8A and 8B, for this range of V, acceptable levels of bend sensitivity can be achieved with core diameters of 2–10 μm and NA's of 0.19–0.07.

Figure 9A:
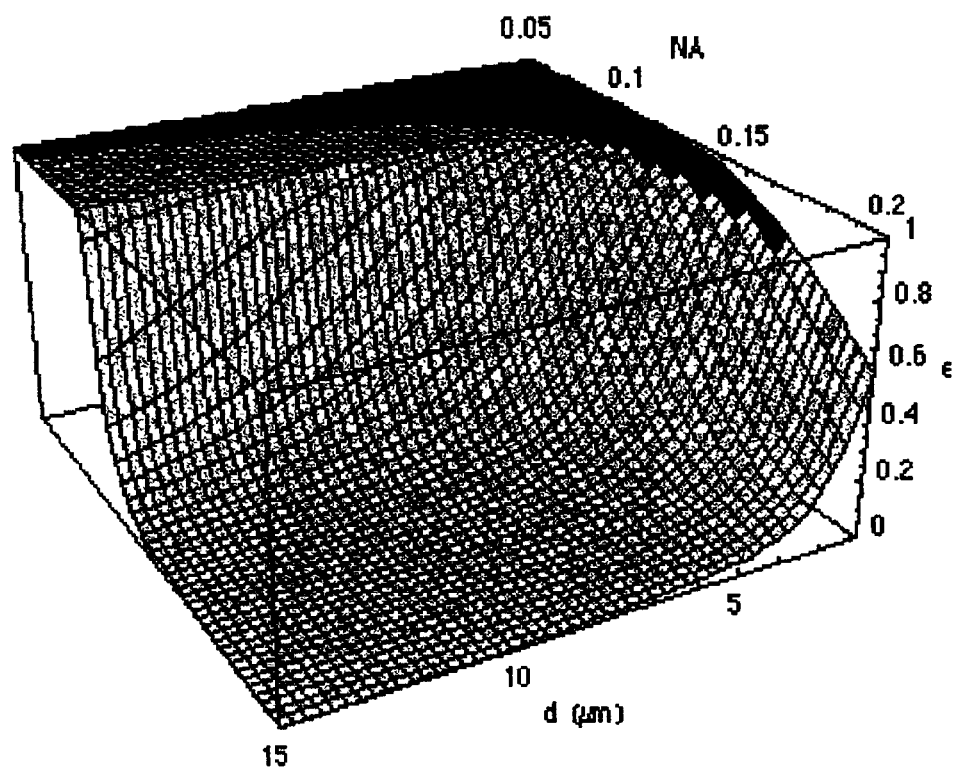
FIGS. 9A–9C show $\epsilon$ as a function of $NA_x$ and core diameter for particular values of $L_b$.
Figure 9B:
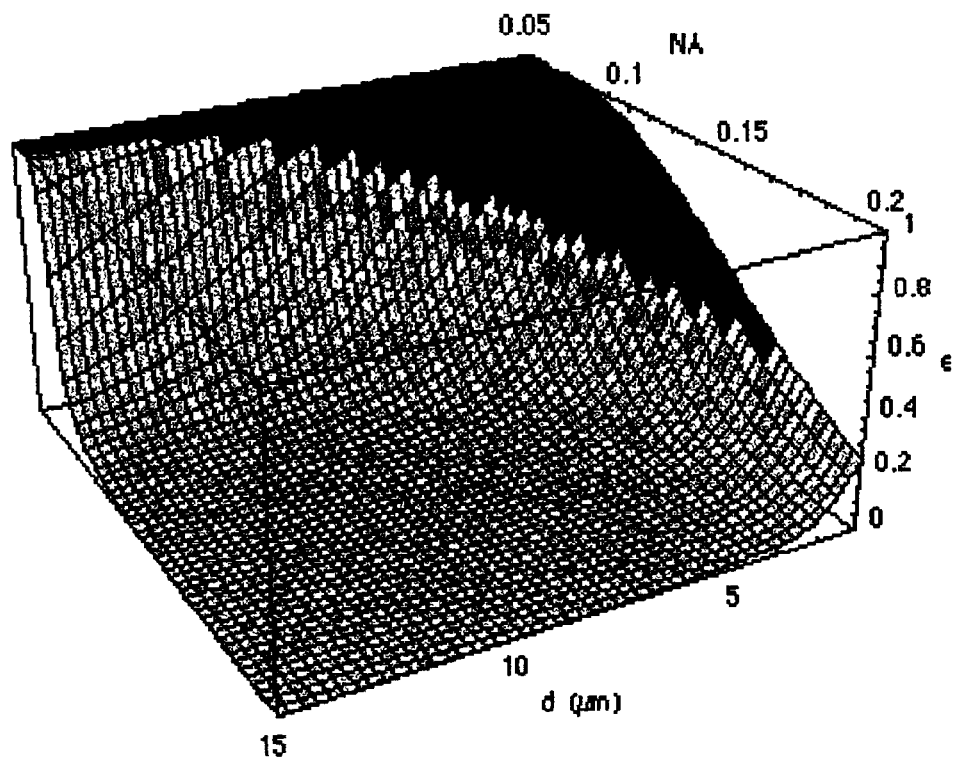
Figure 9C:
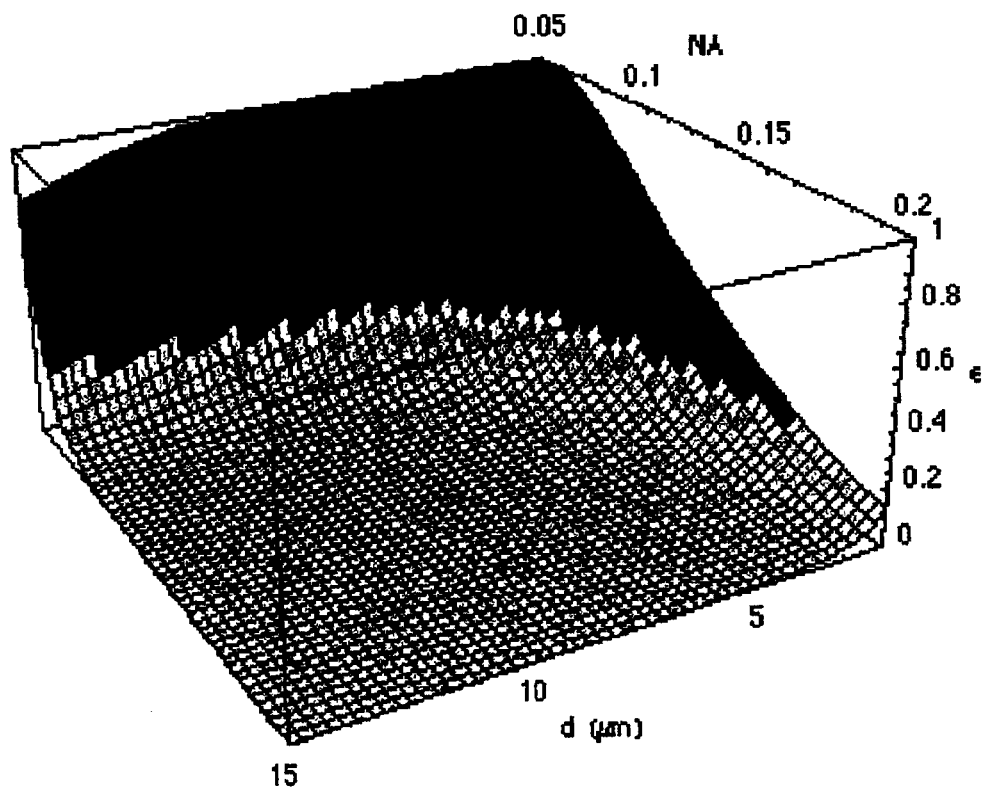

All of the above considerations are summarized in FIGS. 9A–9C, which show $\epsilon$ (Eq. 3B) as a function of $NA_x$ and core diameter for particular values of $L_b$. The plots use a grayscale to indicate the acceptable range of parameters from the bend-loss calculation (FIGS. 8A and 8B). In FIGS. 9A–C, the darker regions correspond to fiber designs with excessive bend loss; the white regions are not excessively bend-sensitive. The results shown in FIGS. 7A–D and 9A–C clearly demonstrate that PER values of practical interest can be achieved with a realistic range of fiber parameters. Moreover, for appropriately designed fibers, very high PER values (>20 dB) are attainable, although relatively large birefringences ($L_b$<0.5 mm) are required.

It is noted that the mechanism discussed in this section (preferential gain for one polarization state) is distinct from those used to obtain PZ operation with passive fibers (preferential loss or non-guiding behavior for one polarization state). Nonetheless, the present technique is fully compatible with the passive-PZ approaches. Thus, a gain fiber could be fabricated that employs both the present approach and one or more of the passive-PZ techniques to obtain a higher PER than would be provided by the present technique alone. For example, the higher-NA polarization state has higher gain, as shown above, and is also less bend-sensitive because it has a smaller mode-field radius (FIG. 3); thus, bend loss could be used to provide further discrimination between the x- and y-polarized modes (without compromising any performance characteristics of the fiber amplifier). Nonetheless, the present approach alone can provide a large enough PER for many applications, and thus this invention does not require the passive-PZ techniques for practical implementation.

Nonlinear Processes

Finally, the fiber-design considerations relevant to applications in which nonlinear process are important are examined. For instance, the onset of nonlinear processes in the fiber can limit the maximum attainable peak power for pulsed fiber sources and the maximum attainable cw power for narrow-linewidth sources. Nonlinear processes are minimized by making the mode-field diameter large (i.e., the NA low and the core diameter large). As shown in FIGS. 8A and 8B, the minimum NA and maximum core diameter for a single-mode fiber (V<2.405) that is not excessively bend sensitive are 0.064 and 13 μm, respectively ($\lambda$=1100 nm). For such a fiber, if $L_b$<0.83 mm, $\epsilon$ is >0.33 (i.e., the PER is >10 for an amplifier with $G_x$>30 dB); although high, this level of birefringence has been achieved in practice for passive PM fibers.

Even larger mode-field diameters can be achieved with multimode fibers. As seen in FIGS. 7A–D and 9A–B, the present technique enables fabrication of PZ multimode fibers if the birefringence is sufficiently large.

Some applications exploit nonlinear processes in the fiber and thus require small mode-field diameters, which are also compatible with the present invention (e.g., the region with d<5 μm in FIG. 9).

Possible Embodiments

Exemplary embodiments that are within the scope of the invention include the following:

1) Various rare-earth dopants (e.g., $Yb^{3+}$, $Er^{3+}$, $Nd^{3+}$, $Tm^{3+}$, $Ho^{3+}$, $Pr^{3+}$) or combinations of rare-earth dopants may be used to access different spectral regions and/or to vary other properties of the fiber (e.g., pump wavelength, absorption coefficient, the need for co-dopants).

2) Any mechanism or combination of mechanisms for generating birefringence may be used, including the designs shown in FIG. 1, approaches that employ shape-induced birefringence (e.g., elliptical core or side-pit fiber), and/or photonic crystal (holey) fibers.

3) Appropriately designed refractive-index profiles may enhance the preferential overlap of one of the polarization states with the rare-earth dopant. For instance, W-type fibers, which have relatively large mode-field diameters, may allow the technique to be extended to larger V-numbers.

4) One or more passive-PZ mechanisms may be implemented to increase the PER. Some of these mechanisms were outlined above.

5) The rare-earth-dopant distribution may be varied to enhance its preferential overlap with the mode-field distribution of one polarization state. For example, rather than doping the entire core, confining the rare-earth dopant to the central region of the core will increase the PER (for appropriate choices of $NA_x$, $V_x$, and $L_b$). This approach will be particularly useful at larger V-numbers (where $F_{core}$ is less sensitive to V) and may enable fabrication of PZ fiber sources using multimode gain fiber (V>2.405).

6) The rare-earth-doped fiber may be single-clad or double-clad.
7) The rare-earth-doped fiber may be single mode or multimode. If multimode, various approaches may be employed to achieve single-transverse-mode operation.
8) The PZ gain fiber may be designed to have a mode-field diameter or other properties that match a standard fiber (e.g., commercially available conventional or PM fiber).
9) The fiber may be silica-based or may be comprised of any other glass or combination of glasses.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A linearly polarized fiber amplifier (LPFA), comprising:
    a length of fiber optic that includes a birefringent core, a cladding surrounding said core, and a rare-earth dopant, wherein said fiber optic comprises a first V-number for a first linear polarization state and a second V-number for a second linear polarization state that is substantially orthogonal to said first linear polarization state, and wherein, when optically pumped, said fiber optic exhibits preferential gain for said first linear polarization state rather than for said second linear polarization state.

2. The LPFA of claim 1, wherein said core comprises said rare-earth dopant.

3. The LPFA of claim 1, wherein said first V-number is not equal to said second V-number.

4. The LPFA of claim 1, wherein the spatial overlap of said first linear polarization state with a spatial distribution of said rare-earth dopant is greater than the corresponding spatial overlap of said second linear polarization state with said spatial distribution of said rare-earth dopant.

5. The LPFA of claim 1, wherein said fiber optic comprises a greater index of refraction difference between said core and said cladding for said first linear polarization state than for said second linear polarization state.

6. The LPFA of claim 1, wherein said first V-number is in a range, wherein a first derivative of $F_{core}$ with respect to V ($dF_{core}/dV$), is greater than 0.1.

7. The LPFA of claim 1, further comprising means for optically pumping said rare-earth dopant.

8. The LPFA of claim 7, wherein said means for optically pumping said rare-earth dopant comprises a diode laser.

9. The LPFA of claim 1, wherein said core comprises a first birefringence and said cladding comprises a second birefringence, wherein said first birefringence is greater than said second birefringence.

10. The LPFA of claim 1, wherein said fiber optic has a higher NA for said first linear polarization state than for said second linear polarization state.

11. The LPFA of claim 1, wherein the difference in index of refraction between said core and said cladding for said first linear polarization state is larger than the difference in index of refraction between said core and said cladding for said second linear polarization state.

12. The LPFA of claim 1, wherein said fiber optic is selected from the group consisting of a step-index fiber optic, a graded-index fiber optic, and a W-type fiber optic.

13. The LPFA of claim 1, wherein said fiber optic comprises a plurality of polarizing mechanisms.

14. The LPFA of claim 1, wherein said fiber optic is characterized by a polarization extinction ratio (PER), wherein said PER is maximized by maximizing the birefringence of said fiber optic.

15. The LPFA of claim 1, wherein the numerical aperture and core size of said LPFA are selected to optimize fiber characteristics.

16. The LPFA of claim 1, wherein said rare-earth dopant is selected from the group consisting of $Yb^{3+}$, $Er^{3+}$, $Nd^{3+}$, $Pr^{3+}$, $Tm^{3+}$ and $Ho^{3+}$ and combinations thereof.

17. The LPFA of claim 4, wherein said first and second polarization states comprise a mode field distribution and, wherein said rare-earth-dopant spatial distribution is selected to enhance its preferential overlap by the mode-field distribution of the first linear polarization state.

18. The LPFA of claim 4, wherein said first and second polarization states comprise a mode field distribution and, wherein said fiber optic further comprises a refractive index distribution designed to enhance a preferential overlap of the mode-field distribution of said first linear polarization state with the spatial distribution of the rare-earth dopant.

19. The LPFA of claim 1, wherein said fiber optic comprises a cladding configuration selected from the group consisting of a single-cladding configuration and a double-cladding configuration.

20. The LPFA of claim 1, wherein said fiber optic is selected from the group consisting of a single-mode fiber and a multimode fiber.

21. The LPFA of claim 1, wherein said core comprises silica.

22. The LPFA of claim 1, wherein said core comprises glass.

23. A fiber optic, comprising:
    a birefringent core;
    a cladding surrounding said core; and
    a rare-earth dopant distributed within at least said birefringent core, wherein when said rare-earth dopant is optically pumped two substantially orthogonal linear polarization states propagating within said core will each have a substantially different V-numbers and hence will each have substantially different degrees of spatial overlap with the distribution of said rare-earth dopant.

24. The fiber optic of claim 23, wherein said fiber-optic exhibits higher gain for a first linear polarization state than for a second linear polarization state when said fiber optic is optically pumped, thereby causing linear polarization operation.

25. The fiber optic of claim 23, further comprising means for optically pumping said fiber optic.

26. The fiber optic of claim 23, further comprising a diode laser operatively located with respect to said fiber optic to optically pump said rare-earth dopant.

27. A method for producing linearly polarized light, comprising:
    providing a length of fiber optic that includes a birefringent core, a cladding surrounding said birefringent core, and a rare-earth dopant, wherein said fiber optic comprises a first V-number for a first linear polarization state and a second V-number for a second linear polarization state, wherein said second polarization state is substantially orthogonal to said first linear polarization state, and said first and second polarization states comprising a mode field distribution; and
    optically pumping said rare-earth dopant, wherein said fiber optic exhibits a preferential gain for said first linear polarization state rather than for said second linear polarization state, and thereby producing said linearly polarized light.

28. The method of claim 27, wherein said core comprises said rare-earth dopant.

29. The method of claim 27, wherein the step of providing a length of fiber optic includes choosing said first V-number to be in a range wherein a first derivative of $F_{core}$ with respect to V, ($dF_{core}/dV$), is greater than 0.1.

30. The method of claim 27, wherein the step of optically pumping said rare-earth dopant is carried out with a diode laser.

31. The method of claim 27, wherein the said core comprises a first birefringence and said cladding comprises a second birefringence, wherein said first birefringence is greater than said second birefringence.

32. The method of claim 27, wherein said fiber optic has a higher NA for said first linear polarization state than for said second linear polarization state.

33. The method of claim 27, wherein the difference in index of refraction between said core and said cladding for said first linear polarization state is larger than the difference in index of refraction between said core and said cladding for said second linear polarization state.

34. The method of claim 27, wherein said fiber optic is characterized by a polarization extinction ratio (PER), the method further comprising maximizing said PER by maximizing the birefringence of said fiber optic.

35. The method of claim 27, further comprising selecting the numerical aperture and core size of said fiber optic to optimize fiber characteristics.

36. The method of claim 27, further comprising selecting the fiber NA and core size to minimize nonlinear processes in said fiber optic.

37. The method of claim 27, further comprising selecting the fiber NA and core size to maximize nonlinear processes in said fiber optic.

38. The method of claim 27, wherein said rare-earth dopant is selected from the group consisting of $Yb^{3+}$, $Er^{3+}$, $Nd^{3+}$, $Pr^{3+}$, $Tm^{3+}$ and $Ho^{3+}$.

39. The method of claim 27, wherein the step of providing a length of fiber optic includes providing a rare-earth dopant spatial distribution in said fiber optic selected to enhance its preferential overlap by the mode-field distribution of the first linear polarization state.

40. The method of claim 27, wherein the step of providing a length of fiber optic includes providing a refractive index distribution designed to enhances a preferential overlap of the mode-field distribution of said first linear polarization state with a rare-earth dopant spatial distribution in said fiber optic.

* * * * *